(No Model.)

H. BAKER & R. K. BAXTER.
BOLTING REEL.

No. 540,893.          Patented June 11, 1895.

Witnesses:
E. H. Sturtevant
H. van Oldenneel

Inventors:
Henry Baker
Richard Kenneth Baxter

UNITED STATES PATENT OFFICE.

HENRY BAKER AND RICHARD KENNETH BAXTER, OF CONSTANTINOPLE, TURKEY.

BOLTING-REEL.

SPECIFICATION forming part of Letters Patent No. 540,893, dated June 11, 1895.

Application filed March 6, 1895. Serial No. 540,706. (No model.)

*To all whom it may concern:*

Be it known that we, HENRY BAKER and RICHARD KENNETH BAXTER, residing at Constantinople, Turkey, have invented an Improvement in Bolting-Reels, of which the following is a specification.

This invention relates to apparatus for the separating, sorting, or dressing of flour or other cereal substances, and has for its object the saving of wear upon the silk used as a screen or sieve, the graduation of the material so as to give an even dressing, and the prevention, by the gentle action of the apparatus, of the pulverization of the material to be dressed.

The improvement consists in the mode of connection between the internal and external cylinders, whereby the cereal to be dressed has free access into the outer cylinder and to almost the full surface of the silk or covering with uninterrupted travel from head to tail of the machine; and further in the construction of a spiral conveyer between the internal and external cylinders, acting both as a support and elevator or conveyer to the cereal material; and in order that this invention may be better understood we now proceed to describe the drawings hereto annexed, reference being had to the letters marked thereon.

Figure 1:
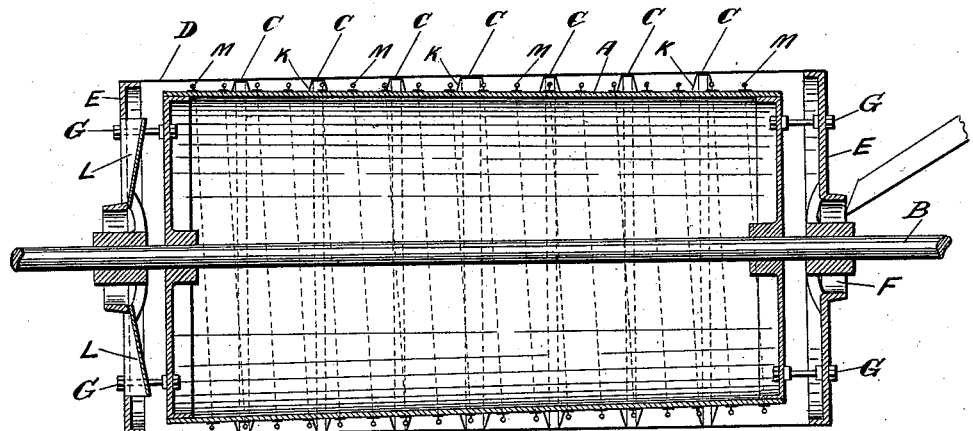
Figure 2:
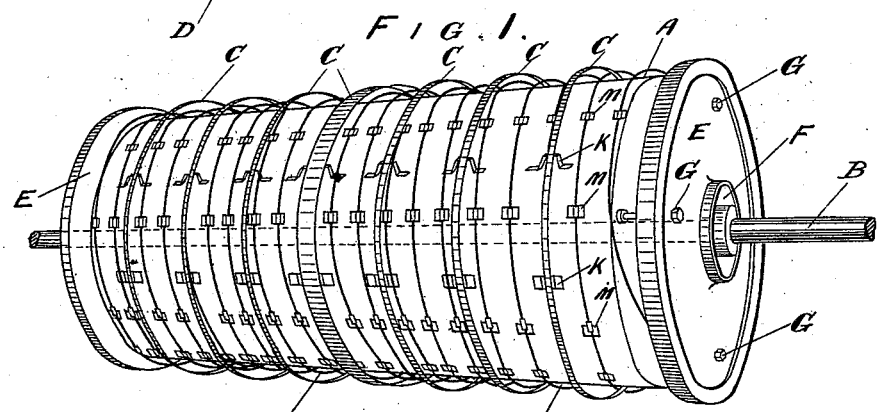
Figures 3, 4:
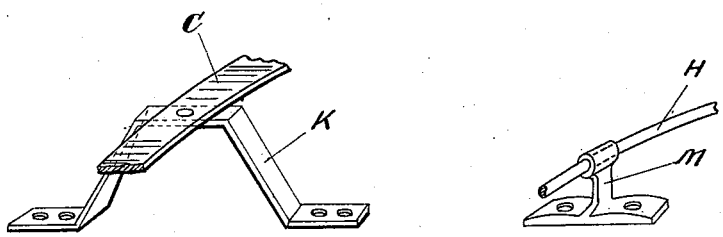

Figure 1 is a longitudinal section of the improved reel. Fig. 2 is a perspective view of the reel with the outer covering of silk removed. Fig. 3 is a detail of the silk-supporting band and bracket. Fig. 4 is a detail of the conveyer rod and bracket.

This apparatus consists of an internal cylinder A preferably of zinc, mounted upon a central shaft B by which the reel is rotated on suitable bearings. This zinc cylinder A is slightly conical in form, and supports a series of circular bands C, by means of brackets K, about its periphery, to which is attached an outer covering of silk or cloth D, forming an external cylinder, outside, but close to, the internal conical zinc cylinder. The said external cloth or silk cylinder D is also stretched on two end plates E, preferably of iron, which are also mounted on the central shaft B, with a central annular opening F, and the said disks or end plates E are also attached to the ends of the zinc cylinder A by bolts G.

The cereal to be dressed is fed through into the central aperture F and thus passes centrifugally at once to the space between the internal and external cylinders, and owing to the manner in which the silk cylinder is supported, the cereal passes without obstruction to the discharge buckets L at the tail of the cylinders traveling the full area of the silk or cloth.

Upon the periphery of the zinc cylinder A, is fitted a spiral conveyer H, formed by a continuous spiral rod mounted upon standards M, and projecting to a suitable distance to lie between the two cylinders A, and D, and thus forms a gentle conveyer, and lifter or elevator, of the cereal substances, between the internal and external cylinders, which it is required to dress.

The inner conical cylinder A and its spiral conveyer H, cause a gentle action of the cereal substance or flour upon the silk covering, and cause the material to graduate to the tail of the machine, giving an exceptionally even dressing without pulverization or injury to the material to be dressed.

Having now particularly described the nature of the said invention and the manner of carrying the same into effect, be it known that what we claim is—

1. In an apparatus for separating or dressing flour or other cereal substances, an external cylinder of silk or cloth; circumferential bands C; brackets K, of different heights supporting same, and fixed to internal conical zinc cylinder; end plates or disks E, mounted on a rotating shaft, spaced from ends of internal cylinder; central orifices therein; bolts attaching and spacing said disks to ends of zinc cylinder, and a spiral conveyer H with brackets M, said conveyer extending under the bands C to move the material along the conical cylinder substantially as described.

2. In an apparatus for separating or dressing flour or other cereal substances, a spiral rod conveyer H, and brackets M, supporting same on internal plate cylinder, and lying mid-way between internal plate and external silk cylinders, for elevating and conveying the cereals substantially as described.

In testimony whereof we have signed our names to this specification in the presence of two subscribing witnesses.

HENRY BAKER.
RICHARD KENNETH BAXTER.

Witnesses:
CHARLES W. KERR,
GUY LOUIS HARTZ.